(12) United States Patent
Zhang et al.

(10) Patent No.: US 8,767,855 B2
(45) Date of Patent: Jul. 1, 2014

(54) METHOD OF ESTIMATING SAMPLING CLOCK OFFSET, A SAMPLING CLOCK OFFSET ESTIMATOR AND A RECEIVER COMPRISING THE SAME

(71) Applicant: Greenvity Communications, Inc., Milpitas, CA (US)

(72) Inventors: Rui Zhang, Cupertino, CA (US); Hung C. Nguyen, San Jose, CA (US)

(73) Assignee: Greenvity Communications, Inc., Milpitas, CA (US)

( * ) Notice: Subject to any disclaimer, the term of this patent is extended or adjusted under 35 U.S.C. 154(b) by 0 days.

(21) Appl. No.: 13/856,970

(22) Filed: Apr. 4, 2013

(65) Prior Publication Data

US 2013/0266056 A1 Oct. 10, 2013

Related U.S. Application Data

(60) Provisional application No. 61/621,474, filed on Apr. 7, 2012.

(51) Int. Cl.
*H04L 5/12* (2006.01)
*H04L 27/34* (2006.01)
(52) U.S. Cl.
CPC .................................. *H04L 27/3455* (2013.01)
USPC ........................................................ 375/261

(58) Field of Classification Search
CPC ........ H04L 1/006; H04L 1/0071; H04L 27/34
USPC .......... 375/261, 260, 267, 308; 370/207, 241; 327/145, 156
See application file for complete search history.

(56) References Cited

U.S. PATENT DOCUMENTS 7,346,114 B2 * 3/2008 Iancu et al. .................... 375/260
8,456,205 B2 * 6/2013 Usugi et al. .................... 327/156

* cited by examiner

*Primary Examiner* — Khai Tran
(74) *Attorney, Agent, or Firm* — Perkins Coie LLP; Aaron Wininger

(57) ABSTRACT

A SCO estimator comprises the following units. A module obtains a first data output by a first unit and copies the first data to obtain copied data. A QAM unit quadrature modulates the copied data into each sub-carrier of each OFDM symbol to regenerate transmitted modulated data. A first phase unit obtains a first phase of each sub-carrier of each OFDM symbol of the modulated data. A second phase unit obtains a second data from a second unit, and obtains a second phase of each sub-carrier of each OFDM symbol of the second data. A comparator generates a comparing result according to the first phase and the second phase of each sub-carrier of each OFDM symbol. A divider divides the comparing result of each sub-carrier by the subcarrier index within each OFDM symbol and the OFDM symbol index of each OFDM symbol. An averaging unit averages the divided comparing result over number of sub-carriers and number of OFDM symbols.

18 Claims, 7 Drawing Sheets

Drawings

METHOD OF ESTIMATING SAMPLING CLOCK OFFSET, A SAMPLING CLOCK OFFSET ESTIMATOR AND A RECEIVER COMPRISING THE SAME

CROSS-REFERENCE TO RELATED APPLICATION(S)

The present application claims the benefit of and incorporates by reference U.S. provisional application No. 61/621,474, filed on Apr. 7, 2012.

TECHNICAL FIELD

The present application relates to Orthogonal Frequency Division Multiplexing (OFDM) communication system, and more particularly, but not exclusively, to a method of estimating sampling clock offset, a sampling clock offset estimator and a receiver comprising the same.

BACKGROUND OF THE INVENTION

In a communication system, a digital to analog converter (DAC) is used at a transmitter and an analog to digital converter (ADC) is used at a receiver. A sampling clock at the DAC is controlled by an oscillator, while a sampling clock at the ADC is controlled by another oscillator. Due to the mismatch of the two oscillators, there is usually a sampling clock offset (SCO) between the receiver and transmitter. The SCO will degrade the performance of a communication system which is sensitive to time offset.

Accordingly, a system and method are needed to compensate for SCO.

BRIEF DESCRIPTION OF THE INVENTION

To this end, a sampling clock offset (SCO) estimator is provided in a communication system. In an embodiment of the invention, the SCO estimator comprises a module, a quadrature amplitude modulation (QAM) unit, a first phase unit, a second phase unit, a comparator, a divider and an averaging unit. The module obtains a first data output by a first unit and copies the first data to obtain copied data. The QAM unit quadrature modulates the copied data into each sub-carrier of each OFDM symbol to regenerate transmitted modulated data. The first phase unit obtains first phase of each sub-carrier of each OFDM symbol of the modulated data. The second phase unit obtains a second data from a second unit, and obtains a second phase of each sub-carrier of each OFDM symbol of the second data. The comparator generates a comparing result according to the first phase and the second phase of each sub-carrier of each OFDM symbol. The divider divides the comparing result of each sub-carrier by the sub-carrier index within each OFDM symbol. Alternatively, the divider divides the comparing result of each sub-carrier by the subcarrier index within each OFDM symbol and the symbol index of each OFDM symbol when more than one OFDM symbols is used. The averaging unit averages the divided comparing result over number of sub-carriers when one OFDM symbols is used to obtain the SCO estimation. Alternatively, the averaging unit averages the divided comparing result over number of sub-carriers and number of OFDM symbols when more than one OFDM symbols are used to obtain the SCO estimation.

In this embodiment, in the SCO estimator, the first phase unit outputs a phase of the regenerated signal, which is used as an ideal signal, while the second phase unit outputs a phase of rotated signal, whose phase rotation is caused by SCO. Then the phase difference is calculated between the regenerated signal and the rotated signal. Further the difference is divided by subcarrier index and OFDM symbol index of each OFDM symbol, and then averaged over number of subcarriers and number of OFDM symbols to obtain a statistic average value of the SCO and the noise can be cancelled by averaging.

In another embodiment, a receiver in a communication system comprises an analog-to-digital converter (ADC), a sync unit, a first de-multiplexer, a sampling clock offset compensation unit, a cyclic prefix (CP) removal, a first Fast Fourier Transform (FFT) unit, a second Fast Fourier Transform (FFT) unit, a channel estimator, a channel equalizer, a second de-multiplexer, a first quadrature amplitude de-modulator and a second quadrature amplitude de-modulator, a first combiner, a second combiner, a first channel deinterleaver, a second channel deinterleaver, a first Turbo decoder, a second Turbo decoder, a descrambler and a sampling clock offset estimator. The ADC receives data. The sync unit synchronizes the received data. The first de-multiplexer de-multiplexes the synchronized data and the received data to generate a first stream of data and a second stream of data. The sampling clock offset compensation unit compensates sampling clock offset for the second stream of data. The CP removal removes cyclic prefix of the compensated second stream of data. The first FFT unit computes a FFT of the first stream of data to obtain a first transformed preamble data. The second FFT unit computes a FFT of the CP-removed second stream of data to obtain a second transformed frame control (FC) and payload data. The channel estimator performs channel estimation according to the first transformed preamble data to obtain channel information. The channel equalizer uses the channel information to equalize the second transformed FC and payload data. The second de-multiplexer de-multiplexes the equalized data into demultiplexed FC and payload data.

As for the FC path, the first quadrature amplitude de-modulator demodulates the de-multiplexed FC data to obtain demodulated FC data. The first combiner combines the demodulated FC data to obtain combined FC data. The first channel deinterleaver deinterleaves the combined FC data to obtain deinterleaved FC data. The first Turbo decoder decodes the deinterleaved FC data to obtain decoded FC data, and outputs the decoded FC data.

As for the payload path, the second quadrature amplitude de-modulator demodulates the de-multiplexed payload data to obtain demodulated payload data. The second combiner combines the demodulated payload data to obtain combined payload data. The second channel deinterleaver deinterleaves the combined payload data to obtain deinterleaved payload data. The second Turbo decoder decodes the deinterleaved payload data to obtain decoded payload data. The de-scrambler descrambles the Turbo decoded payload data and outputs the de-srambled payload data.

The sampling clock offset estimator comprises a module, a quadrature amplitude modulation (QAM) unit, a first phase unit, a second phase unit, a comparator, a divider and an averaging unit. The module obtains a first data output by a first unit and copies the first data to obtain copied data. The QAM unit quadrature modulates the copied data to each sub-carrier of each OFDM symbol to obtain re-generated OFDM symbols. The first phase unit obtains a first phase of each sub-carrier of the each re-generated OFDM symbol. The second phase unit obtains a second data from a second unit, and obtains a second phase of each sub-carrier of each OFDM symbol of the second data. The comparator generates a comparing result of each sub-carrier of each OFDM symbol according to the first phase and the second phase. The divider divides the comparing result of each sub-carrier by the sub-carrier index and the averaging unit averages the divided comparing result over number of sub-carriers when one OFDM symbols is used to obtain the SCO estimation. Alternatively, the divider divides the comparing result of each sub-carrier by the subcarrier index within each OFDM symbol and the symbol index of each OFDM symbol when more than one OFDM symbols is used. Alternatively, the averaging unit averages the divided result over number of sub-carriers within each OFDM symbols and number of OFDM symbols when more than one OFDM symbols are used to obtain the SCO estimation.

Alternatively, the first data may be FC OFDM symbols, the first unit comprises the first combiner.

Alternatively, the first data may be payload OFDM symbols, the first unit comprises the second combiner.

Alternatively, the first data may be FC and payload OFDM symbols, the first unit comprises the first combiner, the second combiner and a first multiplexer to connect the output of the first combiner and the second combiner.

In another embodiment, a method of estimating sampling clock offset in a communication system comprises obtaining a first data output by a first unit and copying the data to obtain copied data; quadrature modulating the copied data into each sub-carrier of each OFDM symbol to regenerate transmitted modulated data; obtaining a first phase of each sub-carrier of each OFDM symbol of the modulated data; obtaining a second data from a second unit, and obtaining a second phase of each sub-carrier of each OFDM symbol of the second data; generating a comparing result according to the first phase and the second phase of each sub-carrier of each OFDM symbol. The method further comprises dividing the comparing result of each sub-carrier by the sub-carrier index within each OFDM symbol in the communication system; and averaging the divided comparing result over number of sub-carriers when one OFDM symbols is used to obtain the SCO estimation. Alternatively, the method comprises dividing the comparing result of each sub-carrier by the subcarrier index within each OFDM symbol and the symbol index of each OFDM symbol and averaging the divided comparing result over number of sub-carriers and number of OFDM symbols when more than one OFDM symbols are used to obtain the SCO estimation.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Various aspects and examples of the invention will now be described. The following description provides specific details for a thorough understanding and enabling description of these examples. In an alternative embodiment, the invention may be practiced without many of these details. Additionally, some well-know structures or functions may not be shown or described in detail to avoid obscuring the relevant description of the embodiments of the invention.

Terminologies presented in the specification including but not limited to the explained ones are intended to be interpreted in their broadest reasonable manner, even though they are used in conjunction with a detailed description of certain specific examples of the invention. Some terms may even be emphasized below, however, any terminology intended to be interpreted in any restricted manner will be overtly and specifically defined as such in this Detailed Description section.

In a communication system, if we assume the transmitter has an ideal sampling time interval $T=1/f_s$, here $f_s$ is the sampling clock frequency, and at the receiver side the sampling clock interval is T', then the sampling clock offset error between the transmitter and the receiver can be defined as $$\beta = \frac{T' - T}{T}, \text{ in parts per million (ppm)}. \quad (1)$$

For a Home Plug Green PHY (HPGP) system, the communication system including a transmitter and a receiver can only tolerate a sampling clock offset error as +/−50 ppm. The positive ppm means a slower receiver clock. The negative ppm means a faster receiver clock.

Estimation Algorithm

For an OFDM system, the phase rotation caused by a normalized SCO β for the n-th sub-carrier of the i-th OFDM symbol, is:

$$\theta_i^n = 2\pi \times i \times n \times \beta \times \frac{Ts}{Tu} \quad (2)$$

Therefore, a SCO β can be represented as $$\beta = \frac{\theta_i^n}{2\pi \times i \times n \times \frac{Ts}{Tu}} \quad (3)$$

In an application scenario of HPGP, $T_u$=3072 is the Fast Fourier Transform (FFT) size, which is also the total number of sub-carriers, and $T_s=T_u$+GI (Guard Interval, i.e. cyclic prefix (CP)), and $T_s$ is the total number of samples per symbol. Those skilled in the art should appreciate that the size of FFT and GI may vary according to different communication system.

Figure 1:
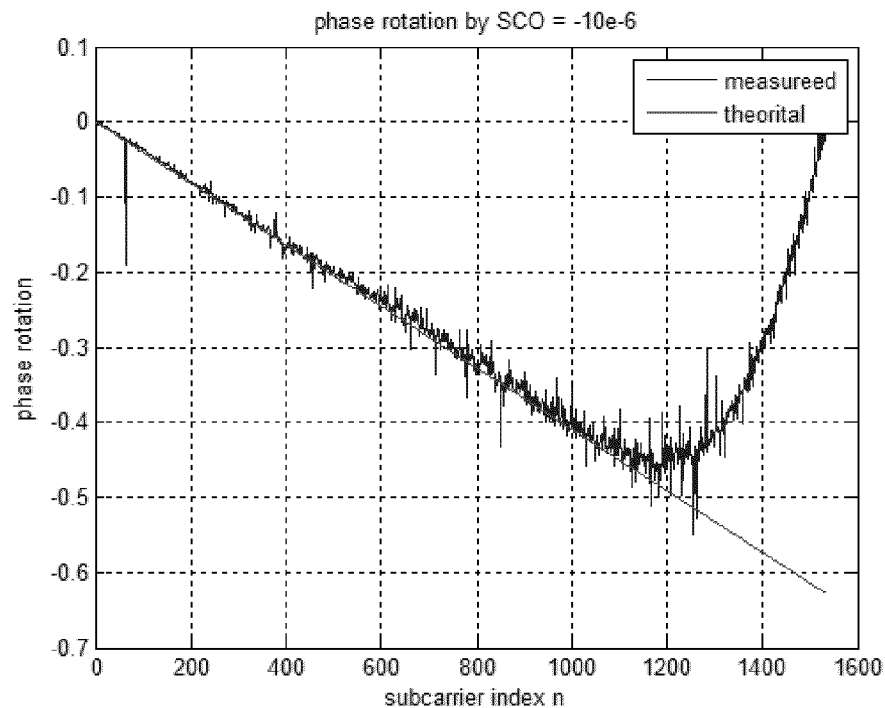
FIG. 1 shows a simulation result of phase rotation of all sub-carriers within one OFDM symbol caused by negative SCO according to an embodiment of the invention.
Figure 2:
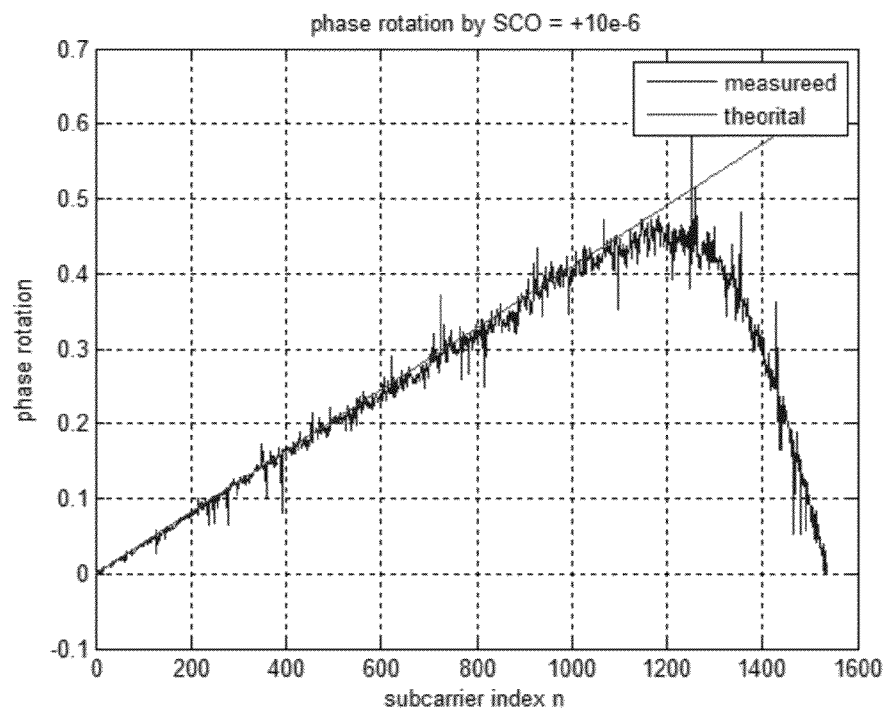
FIG. 2 shows a simulation result of phase rotation of all sub-carriers within one OFDM symbol caused by positive SCO according to an embodiment of the invention.

Therefore the phase rotation within an OFDM symbol i is only proportional to sub-carrier index n. FIG. 1 shows a simulation result according to an embodiment of the invention. FIG. 2 shows a simulation result according to an embodiment of the invention. In FIG. 1 and FIG. 2, the horizontal axis represents subcarrier index n, while the vertical axis represents phase rotation θ. As can be seen, negative SCO causes negative phase rotation and positive SCO causes positive phase rotation. In FIG. 1 and FIG. 2, the smooth oblique line represents the theoretical chart and the variation caused by noise or glitch line represents the measured chart.

Figure 3:
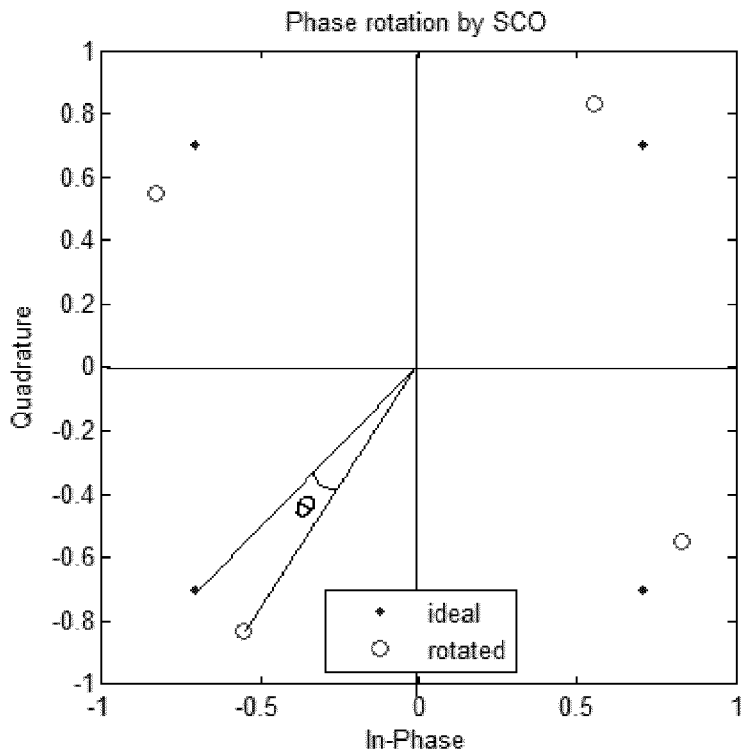
FIG. 3 shows a constellation diagram of phase rotation for one sub-carrier caused by SCO according to an embodiment of the invention.

FIG. 3 shows a constellation diagram of phase rotation caused by SCO for one sub-carrier. In FIG. 3, both the rotated constellation and ideal constellation for quadrature phase shift keying (QPSK) modulated symbols for each subcarrier are shown. In FIG. 3 horizontal axis represents in-phase of constellation diagram, and vertical axis represents quadrature diagram. Further, circle legend represents ideal symbol, while point legend represents rotated symbol. Phase rotation caused by SCO β is represented as angle θ.

Figure 4:
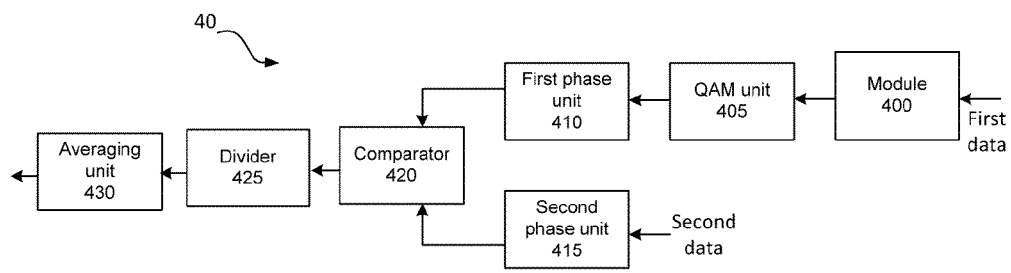
FIG. 4 shows a block diagram of a sampling clock offset estimator according to embodiment of the invention.

FIG. 4 shows a block diagram of a sampling clock offset estimator according to an embodiment of the invention. A SCO estimator 40 comprises a module 400, a quadrature amplitude modulation (QAM) unit 405, a first phase unit 410, a second phase unit 415 and a comparator 420, a divider 425 and an averaging unit 430. The module 400 obtains a first data output by a first unit and copies the first data to obtain copied data. The QAM unit 405 quadrature modulates the copied data into each sub-carrier of each OFDM symbol to obtain modulated data. The first phase unit 410 obtains phase of each sub-carrier of each OFDM symbol of the modulated data. The second phase unit 415 obtains a second data from a second unit, and obtains a second phase of each sub-carrier of each OFDM symbol of the second data. The comparator 420 generates a comparing result of each sub-carrier of each OFDM symbol according to the first phase and the second phase. In this embodiment, in the SCO estimator 40, the first phase unit 410 outputs a phase of an re-generated signal used as an ideal signal because the actual ideal signal is not known to the receiver, while the second phase unit 415 outputs a phase of rotated signal whose phase rotation is caused by SCO. Then the difference is calculated between the re-generated signal outputted by the first phase unit 410 and the rotated signal outputted by the second phase unit 415. The divider 425 divides the comparing result by the subcarrier index n within each OFDM symbol and OFDM symbols index of each OFDM symbol if more than one OFDM symbols are used. The averaging unit 430 averages the divided comparing result over number of sub-carriers and number of OFDM symbols if more than one OFDM symbols are used. If only one OFDM symbol is used, the divider 425 divides the comparing result by the subcarrier index n within each OFDM symbol then the averaging unit 430 averages the divided comparing result over number of sub-carriers.

Figure 6:
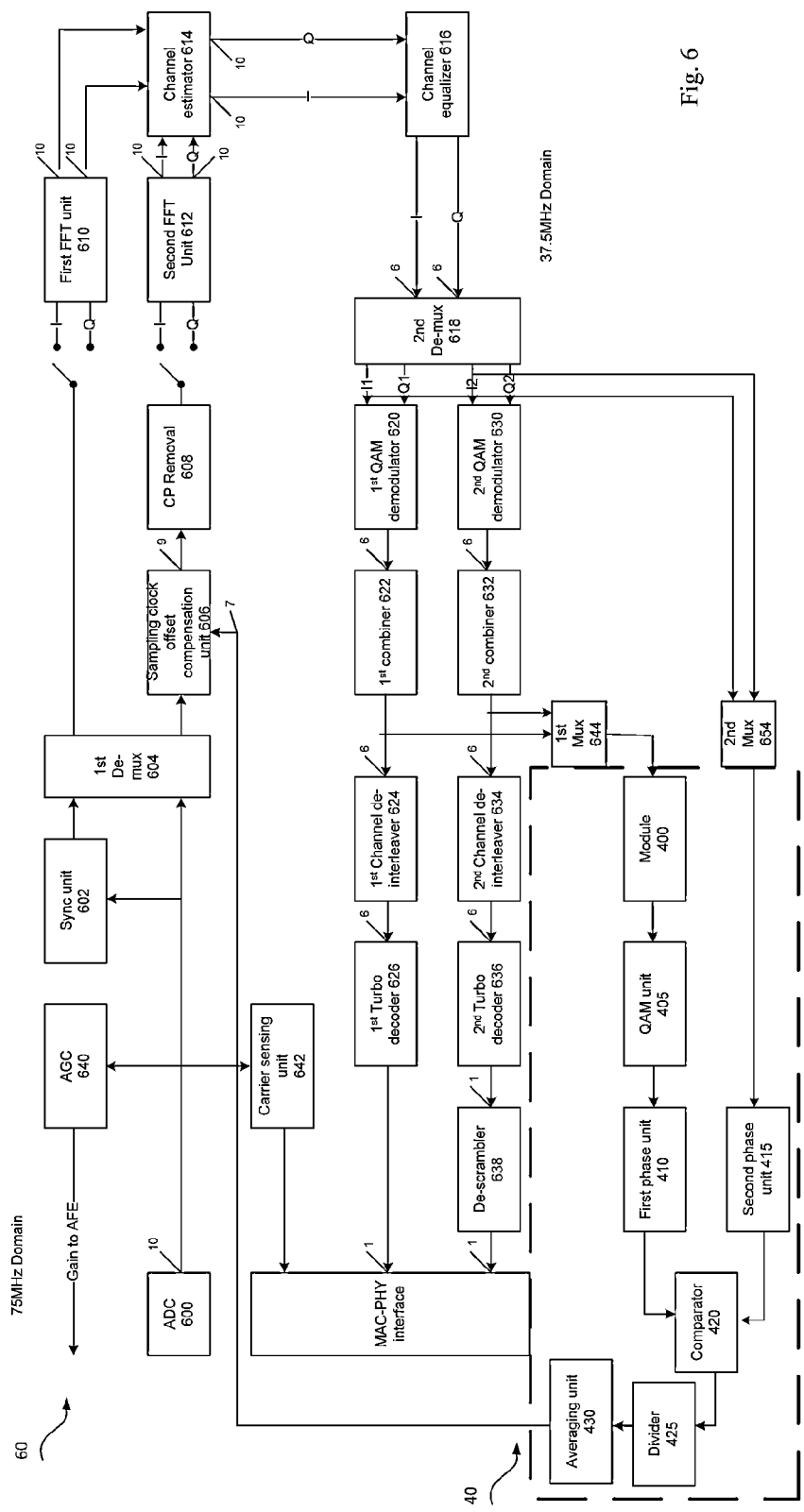
FIG. 6 shows a block diagram of a receiver according to an embodiment of the invention.

Alternatively, the first unit comprises a first combiner and the second unit comprises a second de-multiplexer, as shown in FIG. 6.

FIG. 6 shows a block diagram of a receiver according to an embodiment of the invention. FIG. 6 comprises the SCO estimator 40 shown in FIG. 4. Further as shown in FIG. 6, the first unit comprises a first combiner 622. When the first data are FC OFDM symbols, the module 400 processes the frame control OFDM symbols from the first combiner 622. Further as shown in FIG. 6, the second unit comprises a second de-multiplexer 618. That means, if only FC symbols are used, I1 and Q1 into first QAM demodulator 620 should be fed into the second unit 415.

Alternatively, when the first data are payload OFDM symbols, the module 400 processes the payload OFDM symbols. Further as shown in FIG. 6, the first unit comprises a second combiner 632 and the second unit comprises the second de-multiplexer 618. If payload is used, I2 and Q2 into second QAM demodulator 630 should be connected to 415. Alternatively, when both FC and payload OFDM symbols are used, the receiver may further comprise a first multiplexer 644, which is used to multiplex the combined FC data and the combined payload data to send to the module 400. At the same time, the receiver may further comprise a second multiplexer 654, which is used to multiplex the de-multiplexed FC data and the de-multiplexed payload data from 618 to the second phase unit 415.

Those skilled in the art can understand that the FC symbols and the payload symbols can be used separately or combined for SCO estimation. Detailed description of FIG. 6 will be given as follows.

Figure 5:
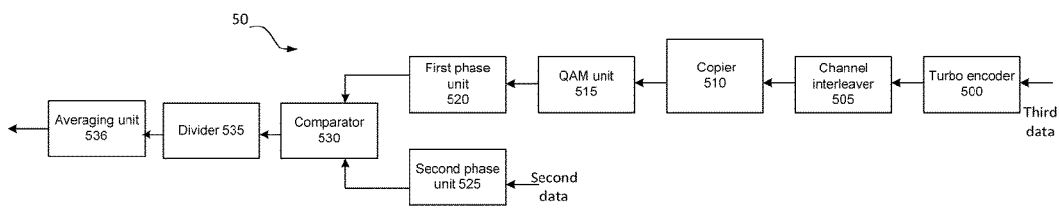
FIG. 5 shows a block diagram of a sampling clock offset estimator according to another embodiment of the invention.

FIG. 5 shows a block diagram of a sampling clock offset estimator according to another embodiment of the invention. In FIG. 5, similar reference signs represent similar reference signs as in FIG. 4. Compared with the sampling clock estimator 40 shown in FIG. 4, the sampling clock offset estimator 50 further comprises a Turbo encoder 530 and a channel interleaver 535. The Turbo encoder 530 obtains a third data from the third unit and Turbo encodes the third data to obtain encoded data. The channel interleaver 535 interleaves the encoded data to generate interleaved data. The first data comprises the interleaved data.

Figure 7:
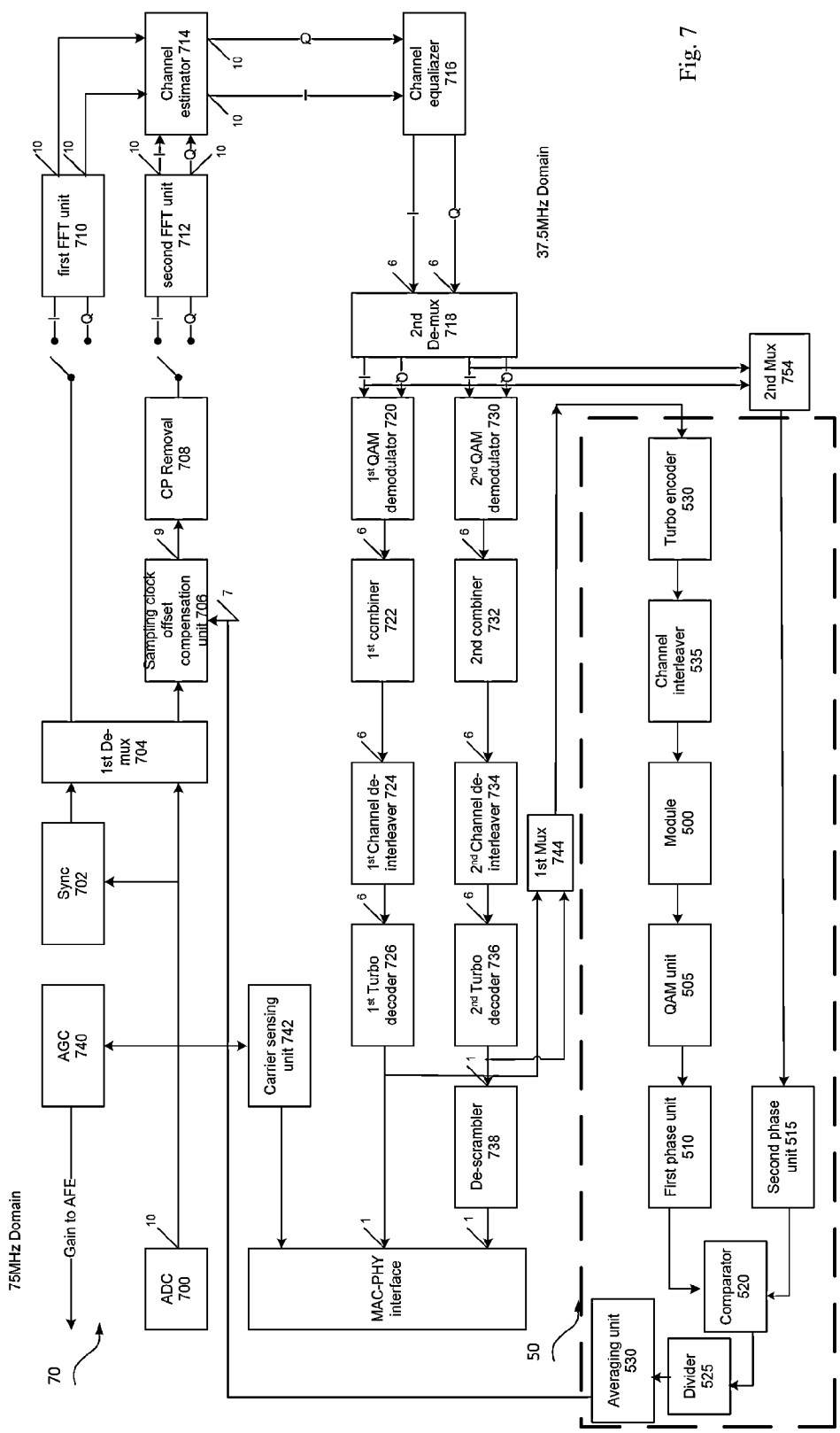
FIG. 7 shows a block diagram of a receiver according to another embodiment of the invention.

FIG. 7 shows a block diagram of a receiver according to another embodiment of the invention. In FIG. 7, it is shown that the second unit comprises a second de-multiplexer 718, as second de-multiplexer 718 is similar to the second de-multiplexer 618, we won't go into details of the second de-multiplexer 718. Detailed description of FIG. 7 will be given as follows.

Alternatively, the quadrature amplitude modulation unit comprises a QPSK modulation unit, a 16QAM unit or a 64QAM unit.

Alternatively, the first data comprises frame control data or payload data.

Alternatively, the second data comprises frame control data or payload data.

Alternatively, the third data comprises frame control data or payload data

FIG. 6 shows a diagram of a receiver 60 in a communication system. The receiver 60 comprises an analog-to-digital converter (ADC) 600, a sync unit 602, a first de-multiplexer 604, a sampling clock offset compensation unit 606, a cyclic prefix (CP) removal 608, a first fast Fourier Transform (FFT) unit 610, a second FFT unit 612, a channel estimator 614, a channel equalizer 616, a second de-multiplexer 618, a first quadrature amplitude de-modulator 620, a first combiner 622, a first channel deinterleaver 624, a first Turbo decoder 626 and a sampling clock offset estimator 40 shown in the dashed block. The receiver 60 further comprises a second quadrature amplitude de-modulator 630, a second combiner 632, a second channel deinterleaver 634, a second Turbo decoder 636 and a descrambler 638.

Alternatively, the receiver 60 further comprises a first multiplexer 644 and a second multiplexer 645, The ADC 600 receives data. The sync unit 602 synchronizes the received data. The first de-multiplexer 604 de-multiplexes the synchronized data and the received data to generate a first stream of preamble data and a second stream of FC and payload data. The sampling clock offset compensation unit 606 compensates a sampling clock offset for the second stream of FC and payload data. Those skilled in the art should understand that the first stream of data corresponds to preamble, and the second stream of data corresponds to frame control and payload data. Both frame control and payload data may need sampling clock offset compensation.

The CP removal 608 removes cyclic prefix of the compensated second stream of FC and payload data. The switch after the CP removal 608 converts the data stream from 1-path at 75 MHz to 2 paths, one is I, the other one is Q, at 37.5 MHz, i.e., the even samples 0, 2, 4, . . . will become In-phase (I) and odd samples 1, 3, 5, . . . will become Quadrature (Q). The first FFT unit 610 computes a FFT of the first stream of preamble data to obtain a first transformed preamble data. The second FFT unit 612 computes a FFT of the CP-removed second stream of FC and payload data to obtain a second transformed FC and payload data. The channel estimator 614 performs channel estimation according to the first transformed preamble data to obtain channel information. The channel equalizer 616 uses the channel information to equalize the second transformed FC and payload data to obtain equalized FC and payload data. The second de-multiplexer 618 de-multiplexes the equalized data into demultiplexed FC and payload. As for the FC path, the first quadrature amplitude de-modulator 620 demodulates the de-multiplexed FC data to obtain demodulated FC data. The first combiner 622 combines the demodulated FC data to obtain combined FC data. The first channel deinterleaver 624 deinterleaves the combined FC data to obtain deinterleaved FC data. The first Turbo decoder 626 decodes the deinterleaved FC data to obtain decoded FC data, and outputs the decoded data.

As for the payload path, the second quadrature amplitude de-modulator 630 demodulates the de-multiplexed payload data to obtain demodulated payload data. The second combiner 632 combines the demodulated payload data to obtain combined payload data. The second channel deinterleaver 634 deinterleaves the combined payload data to obtain deinterleaved payload data. The second Turbo decoder 636 decodes the deinterleaved payload data to obtain decoded payload data. The de-scrambler 638 descrambles the decoded payload data and outputs the descrambled data.

The sampling clock offset estimator 40 obtains the combined data from the first combiner 622 and the first path output of the second de-multiplexer 618, and outputs the estimation result to the sampling clock offset compensation unit 606.

Alternatively, the sampling clock offset estimator 40 can also obtains the combined data from the second combiner 632 and the second path output of the second de-multiplexer 618, and outputs the estimation result to the sampling clock offset compensation unit 606.

Alternatively, if both FC and payload data are used, the sampling clock offset estimator 40 can also obtains the combined data from the first multiplexer 644 and the second de-multiplexer 618's output data from the second multiplexer 654, and outputs the estimation result to the sampling clock offset compensation unit 606.

Alternatively, the first FFT unit comprises a 192-point FFT. The second FFT unit comprises a 1536-point FFT.

Alternatively, the first quadrature amplitude de-modulator 630 comprises a QPSK, 16QAM or 64QAM demapper. The second quadrature amplitude de-modulator 630 comprises a QPSK, 16QAM or 64QAM demapper.

AFE represents "Analog Front End". AFE includes LNA (low noise amplifier), low pass filter, VGA (variable gain amplifier) and ADC (analog to digital convertor). The carrier sensing unit 642 is used for CSMA (carrier sense multi access) control. The carrier sensing unit 642 detects whether a carrier is used or is idle (or available) in order to control multiple stations transmit and receive on the same medium.

FIG. 7 shows a diagram of a receiver 70 in a communication system. The receiver 70 comprises an analog-to-digital converter (ADC) 700, a sync unit 702, a first de-multiplexer 704, a sampling clock offset compensation unit 706, a CP removal 708, a first FFT unit 710, a second FFT unit 712, a channel estimator 714, a channel equalizer 716, a second de-multiplexer 718, a first quadrature amplitude de-modulator 720, a first combiner 722, a first channel deinterleaver 724, a first Turbo decoder 726 and a sampling clock offset estimator 50 shown in the dashed block. The receiver 70 further comprises a second quadrature amplitude de-modulator 730, a second combiner 732, a second channel deinterleaver 734, a second Turbo decoder 736 and a descrambler 738. In FIG. 7, similar reference signs refer to similar reference signs as shown in FIG. 6, therefore details are not given to the similar components. The sampling clock offset estimator 50 further comprises a Turbo encoder 530 and a channel interleaver 535. The Turbo encoder 530 obtains a third data from a third unit, and Turbo encodes the third data to obtain encoded data. The third unit can be either the first Turbo decoder 726 when FC OFDM symbols are used, or the second Turbo decoder 736 when payload OFDM symbols are used. Alternatively, the receiver may further comprise a first multiplexer 744, which is used to multiplex the Turbo decoded FC data from the first Turbo decoder 726 and the Turbo decoded payload data from the second Turbo decoder 736 to the Turbo encoder 530. At the same time, the receiver may further comprise a second multiplexer 754, which is used to multiplex the de-multiplexed FC data and the de-multiplexed payload data from the second de-multiplexer 718 to the second phase unit 515. The channel interleaver 535 interleaves the encoded data to generate interleaved data. The channel interleaver 535 outputs the interleaved data to the module 500. Therefore, the first data comprises the interleaved data.

As the processing for the payload data in FIG. 7 is similar to that shown in FIG. 6, the description will not give detailed descriptions on the processing of payload data.

Figure 8:
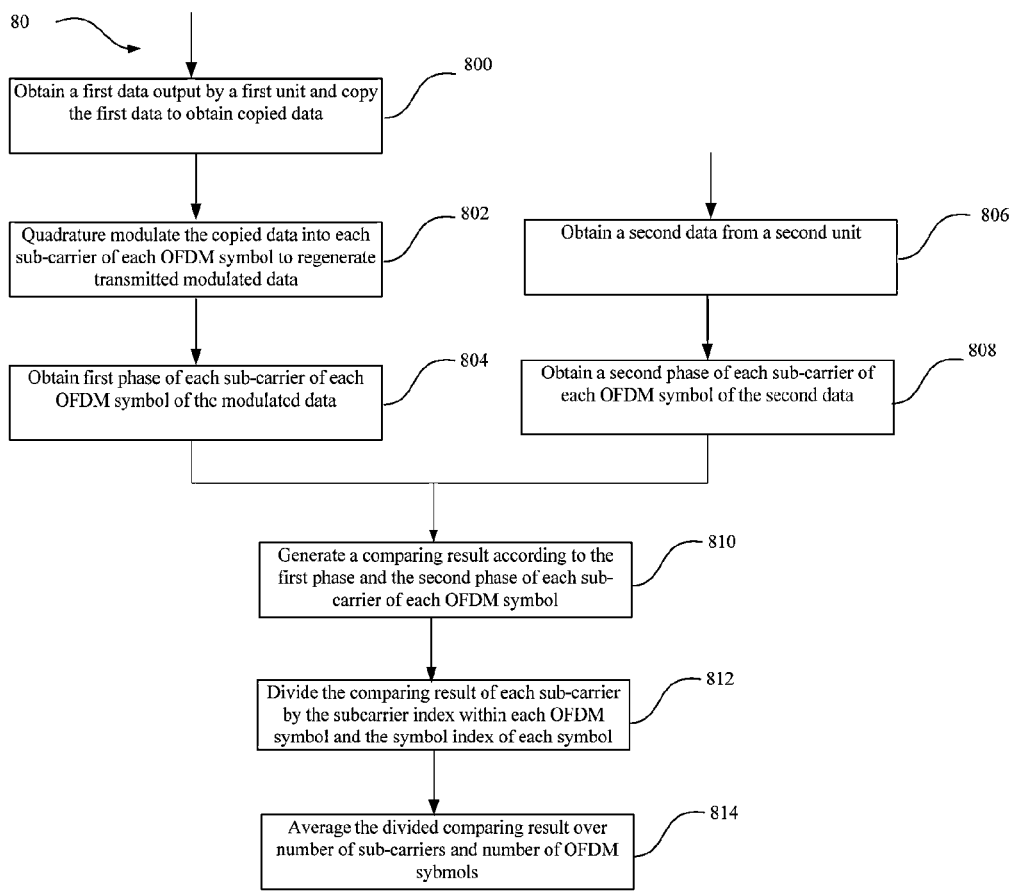
FIG. 8 shows a flow chart of a method of estimating sampling clock offset according to an embodiment of the invention.

FIG. 8 shows a flow chart of a method of estimating sampling clock offset according to an embodiment of the invention. A method 80 comprises obtaining (800) a first data output by a first unit and copying the first data to obtain copied data, quadrature modulating (802) the copied data into each sub-carrier of each OFDM symbol to regenerate transmitted modulated data; obtaining (804) first phase of each sub-carrier of each OFDM symbol of the modulated data; obtaining (806) a second data from a second unit, and obtaining (808) a second phase of each sub-carrier of each OFDM symbol of the second data; generating (810) a comparing result according to the first phase and the second phase of each sub-carrier of each OFDM symbol; dividing (812) the comparing result of each sub-carrier by the subcarrier index within each OFDM symbol, and further by the symbol index of each OFDM symbol if more than one OFDM symbols are used; and averaging (814) the divided comparing result over number of sub-carriers when one OFDM symbols is used, or further averaging (814) over number of OFDM symbols when more than one OFDM symbols are used to obtain the SCO estimation. The obtaining (804) the first phase and the obtaining (808) the second phase do not have to be implemented in the order recited above. In other words, the 804 and 808 can be implemented substantially simultaneously or in different orders.

Figure 8A:
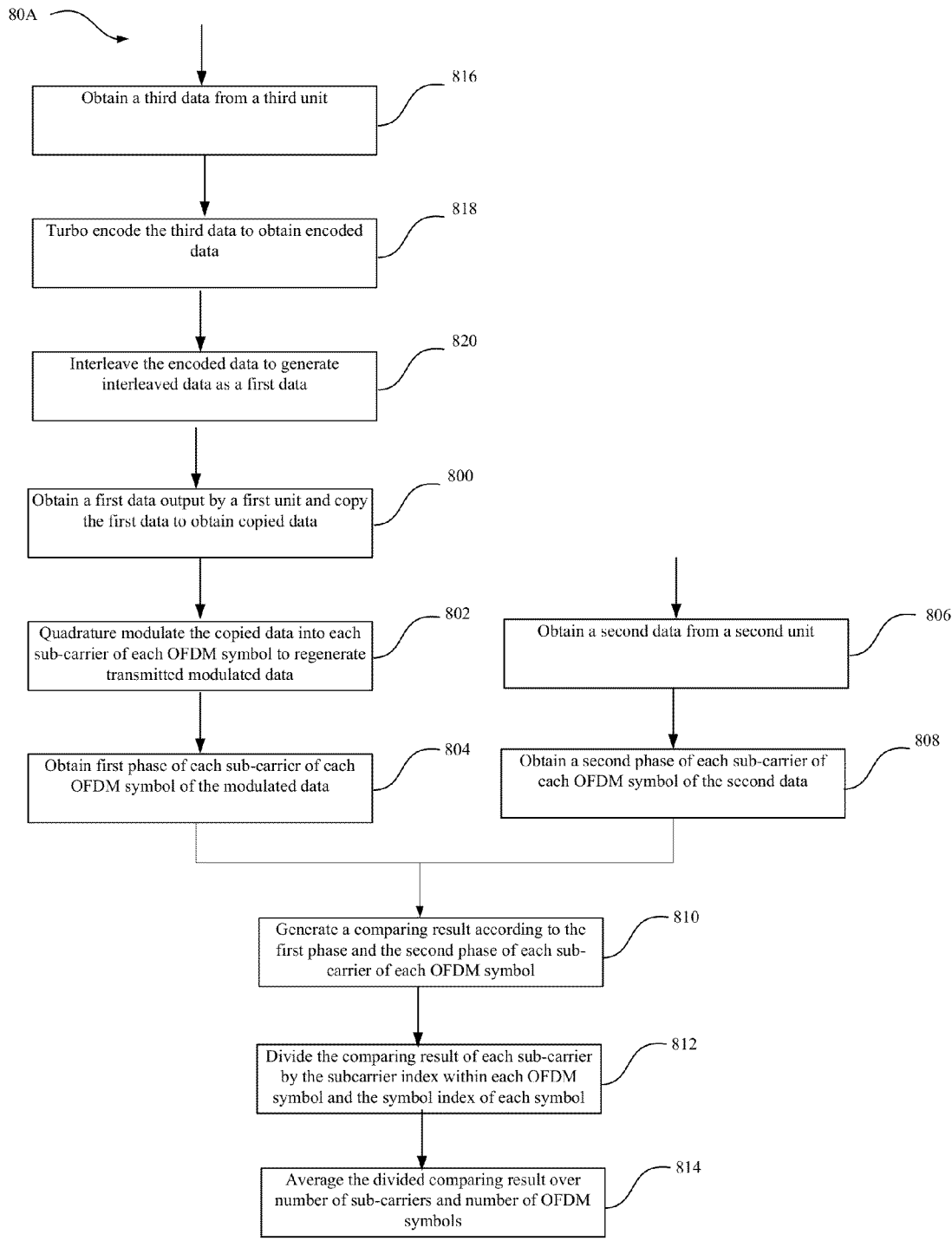
FIG. 8A shows a flow chart of a method of estimating sampling clock offset according to another embodiment of the invention.

FIG. 8A shows a flow chart of a method of estimating sampling clock offset according to another embodiment of the invention. As shown in FIG. 8A, the method 80A further comprises obtaining (816) a third data from a third unit, and Turbo encoding (818) the third data to obtain encoded data; interleaving (820) the encoded data to generate interleaved data; and wherein the first data comprises the interleaved data.

Alternatively, the quadrature amplitude modulation unit comprises a QPSK modulation unit, a 16QAM unit or a 64QAM unit.

Alternatively, the first data comprises frame control data.

Alternatively, the second data comprises frame control data.

Alternatively, the third data comprises frame control data.

Figure 9:
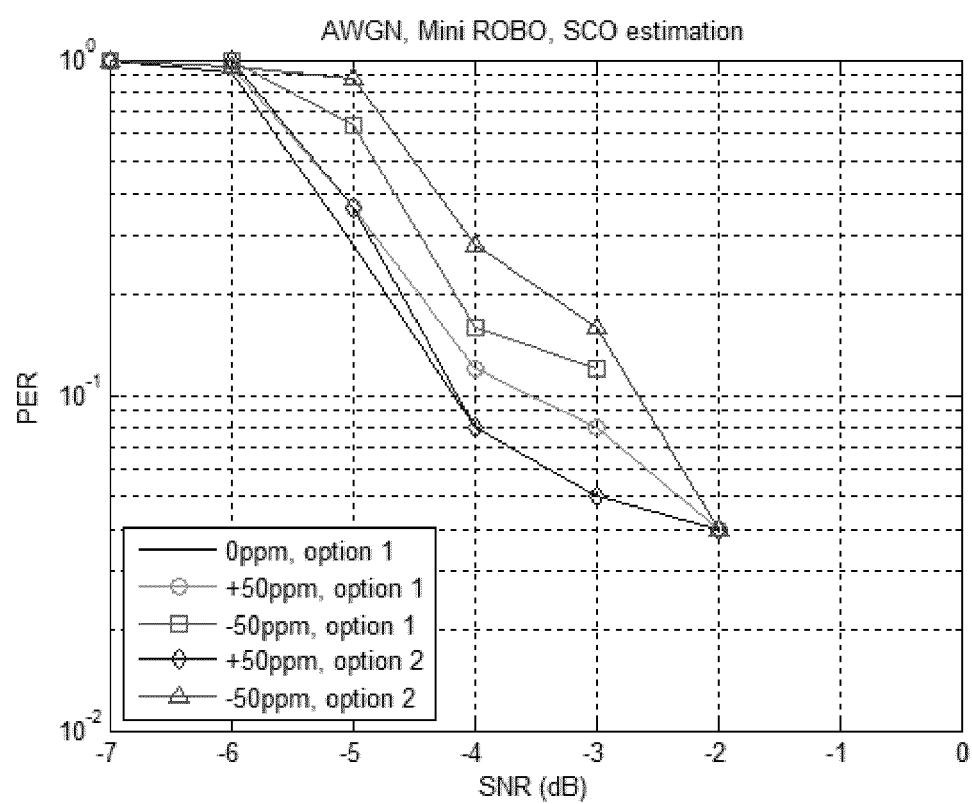
FIG. 9 shows simulation results of the performances of the embodiments shown in FIG. 6 and FIG. 7.

FIG. 9 shows simulation results of the performances of the embodiments shown in FIG. 6 and FIG. 7. In FIG. 9, the horizontal axis represents SNR (Signal Noise Ratio) in dB, and the vertical axis represents PER (Packet Error Rate). The triangle legend represents the embodiment shown in FIG. 6 with SCO=−50 ppm, and the diamond legend represents the embodiment shown in FIG. 6 with SCO=+50 ppm. The rectangle legend represents the embodiment shown in FIG. 7 with SCO=−50 ppm, and the circle legend represents the embodiment shown in FIG. 7 with SCO=+50 ppm. At SNR=−2 dB, the PER is all 0.4 for 0 ppm (without SCO) and for SCO=+/−50 ppm. At SNR=−1 or 0 dB, all the PER is 0, meaning the SCO estimation and compensation is working.

Unless the context clearly requires otherwise, throughout the description and the claims, the words "comprises", and the line are to be construed in an inclusive sense, as opposed to an exclusive or exhaustive sense; that is to say, in the sense of "including, but not limited to". As used herein, the terms "connected", "coupled" or any variant thereof, means any connection or coupling, either direct or indirect, between two or more elements; the coupling of connection between the elements can be physical, logical, or a combination thereof. Additionally, the words "herein", "above", "below", and words of similar import, where used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sampling clock offset estimator in a communication system, comprising:
    a module, configured to obtain a first data output by a first unit and copy the first data to obtain copied data;
    a quadrature amplitude modulation (QAM) unit, configured to quadrature modulate the copied data into each sub-carrier of each OFDM symbol to regenerate transmitted modulated data;
    a first phase unit, configured to obtain a first phase of each sub-carrier of each OFDM symbol of the modulated data;
    a second phase unit, configured to obtain a second data from a second unit, and obtain a second phase of each sub-carrier of each OFDM symbol of the second data;
    a comparator, configured to generate a comparing result according to the first phase and the second phase of each sub-carrier of each OFDM symbol;
    a divider, configured to divide the comparing result of each sub-carrier by the subcarrier index within one OFDM symbol and further by the OFDM symbol index of each OFDM symbol when more than one OFDM symbols are used; and
    an averaging unit, configured to average the divided comparing result over number of sub-carriers.

2. The sampling clock offset estimator of claim 1, wherein the averaging unit is further configured to average the divided comparing result over number of OFDM symbols.

3. The sampling clock offset estimator of claim 1, wherein the first data comprises frame control OFDM symbols, the module comprises a first copier for processing the frame control OFDM symbols, the first unit comprises a first combiner and the second unit comprises a de-multiplexer.

4. The sampling clock offset estimator of claim 1, wherein the first data comprises payload OFDM symbols, the module comprises a second copier for processing the payload OFDM symbols, the first unit comprises a second combiner, and the second unit comprises a de-multiplexer.

5. The sampling clock offset estimator of claim 3, wherein the first data further comprises payload OFDM symbols, wherein the first unit further comprises a second combiner, wherein the first unit further comprises a first multiplexer configured to connect the output of the first combiner and the second combiner, wherein the second unit comprises a second multiplexer configured to connect the output a de-multiplexer.

6. The sampling clock offset estimator of claim 1, further comprising:
    a Turbo encoder, configured to obtain a third data from a third unit, and Turbo encode the third data to obtain encoded data;
    a channel interleaver, configured to interleave the encoded data to generate interleaved data; and
    the first data comprises the interleaved data.

7. The sampling clock offset estimator of claim 6, wherein the second unit comprises a de-multiplexer, the third unit comprises a first Turbo decoder, and the third data comprises frame control OFDM symbols, and the first Turbo decoder comprises a decoder for FC OFDM symbols.

8. The sampling clock offset estimator of claim 6, wherein the second unit comprises a de-multiplexer, the third unit comprises a second Turbo decoder, and the third data comprises payload OFDM symbols, and the second Turbo decoder comprises a decoder for payload OFDM symbols.

9. The sampling clock offset estimator of claim 7, the third unit comprises a second Turbo decoder, wherein the third data further comprise payload OFDM symbols, wherein the third unit further comprises a first multiplexer configured to connect the output of the first Turbo decoder and the second Turbo decoder, wherein the second unit further comprises a second multiplexer configured to connect the output a de-multiplexer.

10. The sampling clock offset estimator of claim 1, wherein the quadrature amplitude modulation unit comprises a QPSK modulation unit, a 16QAM unit or a 64QAM unit.

11. A receiver in a communication system comprising:
an analog-to-digital converter, configured to receive data;
a sync unit, configured to synchronize the received data;
a first de-multiplexer, configured to de-multiplexing the synchronized data and the received data to generate a first stream of data and a second stream of data;
a sampling clock offset compensation unit configured to compensate sampling clock offset for the second stream of data;
a CP removal configured to remove cyclic prefix of the compensated second stream of data;
a first FFT unit configured to compute a FFT of the first stream of data to obtain a first transformed preamble data;
a second FFT unit configured to compute a FFT of the CP-removed second stream of data to obtain a second transformed FC and payload data;
a channel estimator, configured to perform channel estimation according to the first transformed preamble data to obtain channel information;
a channel equalizer, configured to use the channel information to equalize the second transformed FC and payload data to obtain equalized FC and payload data;
a second de-multiplexer, configured to de-multiplex the equalized FC and payload data into demultiplexed FC and payload data;
a first quadrature amplitude de-modulator, configured to demodulate the de-multiplexed FC data to obtain modulated FC data;
a first combiner, configured to combine the demodulated FC data to obtain combined FC data;
a first channel deinterleaver, configured to deinterleave the combined FC data to obtain deinterleaved FC data;
a first Turbo decoder, configured to Turbo decode the deinterleaved data to obtain decoded FC data, and output the decoded FC data,
a second quadrature amplitude de-modulator, configured to demodulate the de-multiplexed payload data to obtain modulated payload data;
a second combiner, configured to combine the demodulated payload data to obtain combined payload data;
a second channel deinterleaver, configured to deinterleave the combined payload data to obtain deinterleaved payload data;
a second Turbo decoder, configured to Turbo decode the deinterleaved data to obtain decoded payload data;
a descrambler, configured to descramble the Turbo decoded payload data and output the descrambled payload data, wherein
the receiver further comprises a sampling clock offset estimator, wherein the sampling clock offset estimator comprises:
a module, configured to obtain a first data output by a first unit and copy the first data to obtain copied data;
a quadrature amplitude modulation (QAM) unit, configured to quadrature modulate the copied data to each sub-carrier to obtain the re-generated OFDM symbols;
a first phase unit, configured to obtain a first phase of each sub-carrier of the each re-generated OFDM symbol;
a second phase unit, configured to obtain a second data from a second unit, and obtain a second phase of each sub-carrier of each OFDM symbol of the second data;
a comparator, configured to generate a comparing result of each sub-carrier of each OFDM symbol according to the first phase and the second phase;
a divider, configured to divide the comparing result of each sub-carrier by the subcarrier index within one OFDM symbol and by the OFDM symbol index of each OFDM symbol; and
an averaging unit, configured to average the divided comparing result over number of sub-carriers and number of OFDM symbols.

12. The receiver of claim 11, wherein the sampling clock offset estimator comprises:
a Turbo encoder, configured to obtain a third data from a third unit, and Turbo encode the third data to obtain encoded data;
a channel interleaver, configured to interleave the encoded data to generate interleaved data;
wherein the first data comprises the interleaved data.

13. The receiver of claim 11, wherein
the first unit comprises a first multiplexer configured to connect the output of the first combiner and the second combiner; and
the second unit comprises a second multiplexer configured to connect the output the second de-multiplexer.

14. The receiver of claim 12, wherein
the third unit comprises a first multiplexer configured to connect the output of the first Turbo decoder and the second Turbo decoder; and
the second unit comprises a second multiplexer configured to connect the output a de-multiplexer.

15. A method of estimating sampling clock offset in a communication system, comprising:
obtaining a first data output by a first unit and copying the first data to obtain copied data;
quadrature modulating the copied data into each sub-carrier of each OFDM symbol to regenerate transmitted modulated data;
obtaining a first phase of each sub-carrier of each OFDM symbol of the modulated data;
obtaining a second data from a second unit, and obtaining a second phase of each sub-carrier of each OFDM symbol of the second data;
generating a comparing result according to the first phase and the second phase of each sub-carrier of each OFDM symbol;
dividing the comparing result of each sub-carrier by the subcarrier index within each OFDM symbol and the OFDM symbol index of each OFDM symbol; and
averaging the divided comparing result over number of sub-carriers when one OFDM symbols is used and further by number of OFDM symbols when more than one OFDM symbols are used to obtain the SCO estimation.

16. The method of claim 15, further comprising:
obtaining a third data from a third unit, and Turbo encoding the third data to obtain encoded data;
interleaving the encoded data to generate interleaved data; and wherein
the first data comprises the interleaved data.

17. The method of claim 15, wherein the quadrature amplitude modulation unit comprises a QPSK modulation unit, a 16QAM unit or a 64QAM unit.

18. The method of claim 15, wherein the first data comprises frame control data, and or payload data.

* * * * *